US012412969B2

(12) United States Patent
Wang et al.

(10) Patent No.: US 12,412,969 B2
(45) Date of Patent: Sep. 9, 2025

(54) COAXIAL FILTER AND COMMUNICATION RADIO FREQUENCY DEVICE

(71) Applicant: Suzhou Luxshare Technology Co., Ltd., Suzhou (CN)

(72) Inventors: Ye Wang, Suzhou (CN); Wen Ge, Suzhou (CN); Xinghua Sun, Suzhou (CN)

(73) Assignee: SUZHOU LUXSHARE TECHNOLOGY CO., LTD, Suzhou (CN)

(*) Notice: Subject to any disclaimer, the term of this patent is extended or adjusted under 35 U.S.C. 154(b) by 288 days.

(21) Appl. No.: 18/133,828

(22) Filed: Apr. 12, 2023

(65) Prior Publication Data

US 2024/0039135 A1 Feb. 1, 2024

(30) Foreign Application Priority Data

Jul. 28, 2022 (CN) ......................... 202210901251.1
Jul. 28, 2022 (CN) ......................... 202221968729.4

(51) Int. Cl.
*H01P 1/202* (2006.01)
*H01Q 5/47* (2015.01)

(52) U.S. Cl.
CPC ............... *H01P 1/202* (2013.01); *H01Q 5/47* (2015.01)

(58) Field of Classification Search
CPC .................................. H01P 1/202; H01Q 5/47
USPC ........................................................... 333/206
See application file for complete search history.

(56) References Cited

U.S. PATENT DOCUMENTS

2010/0244982 A1* 9/2010 Di ......................... H01P 1/2133 333/132
2016/0315368 A1* 10/2016 Liang ......................... H01P 7/04

FOREIGN PATENT DOCUMENTS

CN 102148417 A 8/2011
CN 103035980 A 4/2013
CN 105244574 A 1/2016
CN 210136992 U 3/2020
CN 113745780 A 12/2021
CN 216015662 U 3/2022
CN 216055108 U 3/2022
CN 218448398 U 2/2023
WO WO-2013044678 A1 * 4/2013 ................ H01P 7/10

OTHER PUBLICATIONS

Taiwanese Office Action and Search Report for Taiwanese Application No. 112113046, dated Apr. 2, 2024, with English translation.

(Continued)

*Primary Examiner* — Andrea Lindgren Baltzell
*Assistant Examiner* — Abigai Amir Yaldo
(74) *Attorney, Agent, or Firm* — Birch, Stewart, Kolasch & Birch, LLP

(57) ABSTRACT

Provided are a coaxial filter and a communication radio frequency device. The communication radio frequency device includes the coaxial filter. The coaxial filter includes a housing having a resonant cavity, a cover plate, and a resonator. The cover plate corresponds to the resonant cavity and covers the housing. The resonator includes plurality of elastic pieces, a connection portion, and a body portion which are sequentially connected from one end to another end. The connection portion is connected to a bottom of the resonant cavity.

17 Claims, 4 Drawing Sheets

(56) References Cited

OTHER PUBLICATIONS

Chinese Office Action and Search Report for Chinese Application No. 202210901251.1, dated May 30, 2025, with English translation.

* cited by examiner

A-A

COAXIAL FILTER AND COMMUNICATION RADIO FREQUENCY DEVICE

CROSS-REFERENCE TO RELATED APPLICATIONS

This application claims priority to Chinese Patent Application Nos. 202210901251.1 and 202221968729.4 filed Jul. 28, 2022, the disclosures of which are incorporated herein by reference in their entireties.

TECHNICAL FIELD

The present disclosure relates to the field of wireless communication technology and, in particular, to a coaxial filter and a communication radio frequency device.

BACKGROUND

Filters are commonly used in wireless communication equipment. In a communication system, a coaxial filter is a commonly used filter structure which selectively filters a required signal frequency. An existing coaxial filter includes a housing, a cover plate, a resonator, a screw, and a nut, where the housing has a resonant cavity, the cover plate covers the resonant cavity, the screw corresponding to the resonator penetrates through the cover plate, and the nut is in a threaded connection to the screw. A product frequency is adjusted by adjusting a height of the screw. However, in a screw adjustment method, a product is limited by a height requirement of the screw, which is not conducive to a more miniaturized design and the improvement of power capacity of the product at the same volume. In addition, in a screw adjustment process, metal chips are easily generated, resulting in the reduction of product performance.

SUMMARY

The present disclosure provides a coaxial filter, which can reduce a product volume, can increase power capacity at the same volume, and is conducive to ensuring product performance.

The present disclosure also provides a communication radio frequency device provided with the preceding coaxial filter, which can reduce the product volume and is conducive to ensuring the product performance.

To achieve these objects, the present disclosure adopts the technical solutions described below.

A coaxial filter includes a housing, a cover plate, and a resonator, where the housing has a resonant cavity, the cover plate corresponds to the resonant cavity and covers the housing, the resonator includes multiple elastic pieces, a connection portion, and a body portion which are sequentially connected from one end to another end, the connection portion is connected to a bottom of the resonant cavity, the multiple elastic pieces are evenly spaced apart along a circumferential direction of the body portion, and an operation hole corresponding to the resonator is disposed on the cover plate.

In an embodiment, a respective operation hole corresponding to each of the multiple elastic pieces is disposed on the cover plate.

In an embodiment, the connection portion, the body portion, and the multiple elastic pieces are integrally formed.

In an embodiment, a disk ring extends at an end of the body portion facing away from the connection portion, and the body portion is connected to the multiple elastic pieces through the disk ring.

In an embodiment, an extension direction of the multiple elastic pieces is the same as a direction of a plate surface of the cover plate.

In an embodiment, a mounting protrusion is disposed on a bottom wall of the resonant cavity, where the connection portion is connected to the mounting protrusion.

In an embodiment, multiple resonant cavities are provided and sequentially communicate with each other, where one resonator is disposed in each of the multiple resonant cavities, a coupling adjustment member is disposed between two communicating ones of the multiple resonant cavities, and a top end of the coupling adjustment member is connected to the cover plate.

In an embodiment, the coupling adjustment member is a countersunk screw fixed to the cover plate.

In an embodiment, the multiple elastic pieces are fan-shaped or polygonal.

A communication radio frequency device includes the preceding coaxial filter.

REFERENCE LIST

Figure 1:
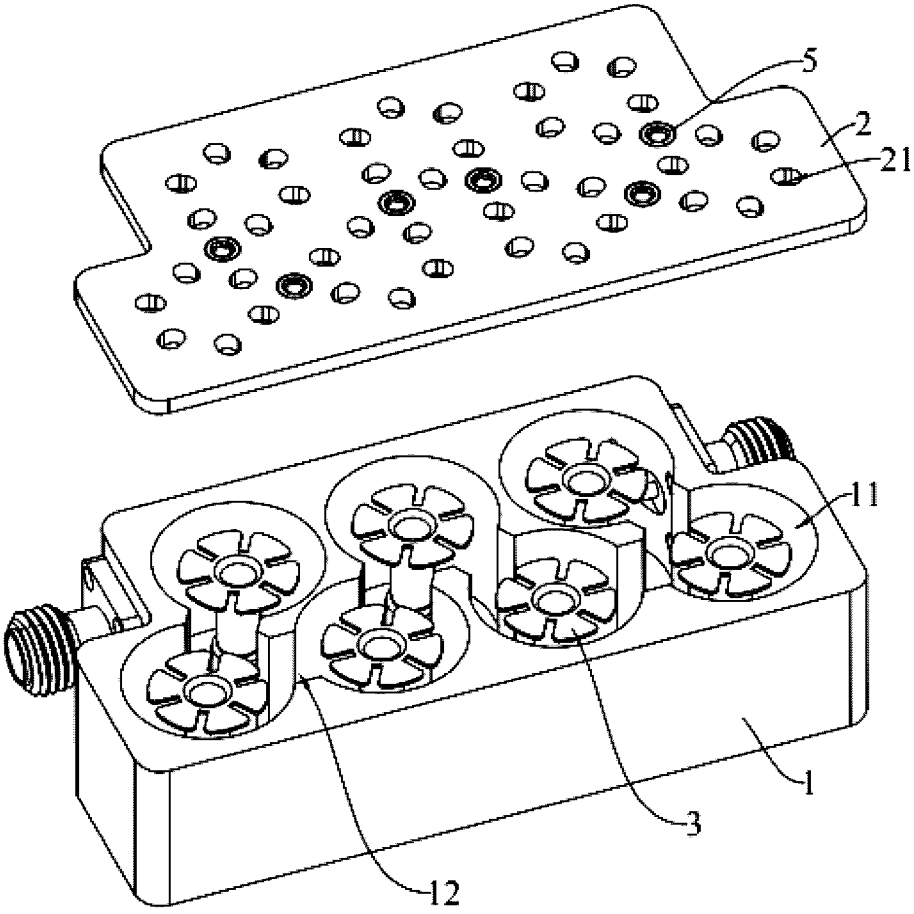
FIG. 1 is an exploded view of a coaxial filter according to an embodiment of the present disclosure.

1 housing
11 resonant cavity
12 opening
2 cover plate
21 operation hole
3 resonator
31 connection portion
32 body portion
33 elastic piece
34 disk ring
4 mounting protrusion
5 coupling adjustment member

DETAILED DESCRIPTION

In the description of the present disclosure, it is to be noted that orientations or position relations indicated by terms such as “center”, “upper”, “lower”, “left”, “right”, “vertical”, “horizontal”, “in”, and “out” are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. Moreover, terms such as "first" and "second" are used only for the purpose of description and are not to be construed as indicating or implying relative importance. Terms "first position" and "second position" are two different positions.

Unless otherwise expressly specified and limited, terms "mounted", "joined" "connected", and "fixed" are to be understood in a broad sense. For example, the term "connected" may refer to "fixedly connected" or "detachably connected", may refer to "mechanically connected" or "electrically connected", or may refer to "connected directly", "connected indirectly through an intermediary", "connected inside two components", or "interaction relations between two components". For those of ordinary skill in the art, specific meanings of the preceding terms in the present disclosure may be understood based on specific situations.

Unless otherwise expressly specified and limited, when a first feature is described as "on" or "under" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Technical solutions of the present disclosure are further described below in conjunction with FIGS. 1 to 7 and embodiments.

This embodiment provides a communication radio frequency device, which may be a duplexer, a combiner, or the like. A specific structure of the radio frequency device is not limited herein. The communication radio frequency device includes a coaxial filter.

Figure 2:
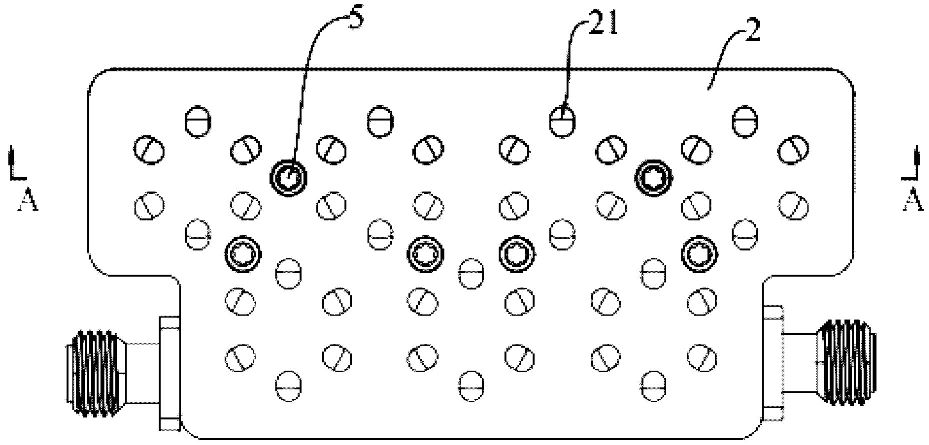
FIG. 2 is a top view of a coaxial filter according to an embodiment of the present disclosure.
Figure 3:
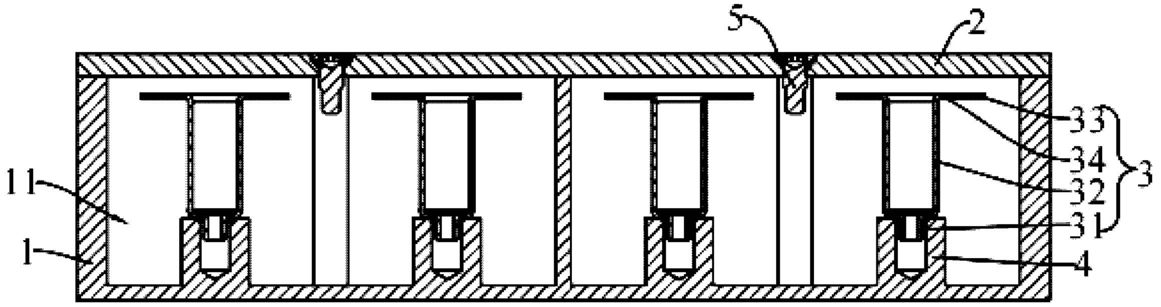
FIG. 3 is a section view taken along line A-A in FIG. 2.

As shown in FIGS. 1 to 3, the coaxial filter includes a housing 1 having a resonant cavity 11, a cover plate 2, and a resonator 3. In detail, the resonant cavity 11 is disposed at a top end of the housing 1. The cover plate 2 corresponds to the resonant cavity 11 and covers the housing 1. The resonator 3 includes multiple elastic pieces 33, a body portion 32 and a connection portion 31 which are sequentially connected from one end to the other end of the resonator 3. In detail, the body portion 32 has a cylindrical structure. The connection portion 31 is connected to a bottom of the resonant cavity 11. The multiple elastic pieces 33 are evenly spaced apart along a circumferential direction of the body portion 32. An operation hole 21 corresponding to the resonator 3 is disposed on the cover plate 2.

With the coaxial filter in this embodiment, the elastic pieces 33 of the resonator 3 in the resonant cavity 11 can be adjusted through the operation hole 21 so that the elastic pieces 33 are deformed, thereby adjusting the frequency, and it is unnecessary to provide a screw for performing the adjustment, which reduces the volume and can increase the power capacity at the same volume. In addition, generation of metal chips in adjusting the screw is avoided without the screw, which is conducive to ensuring product performance.

In detail, when the resonator 3 is adjusted, an adjustment rod of a non-metallic material is used to penetrate the operation hole 21 and vertically strikes any elastic piece 33 downward, or a hook of a non-metallic material is used to pull the elastic piece 33 upward so that the elastic piece 33 is deformed, so as to obtain a required frequency.

Figure 4:
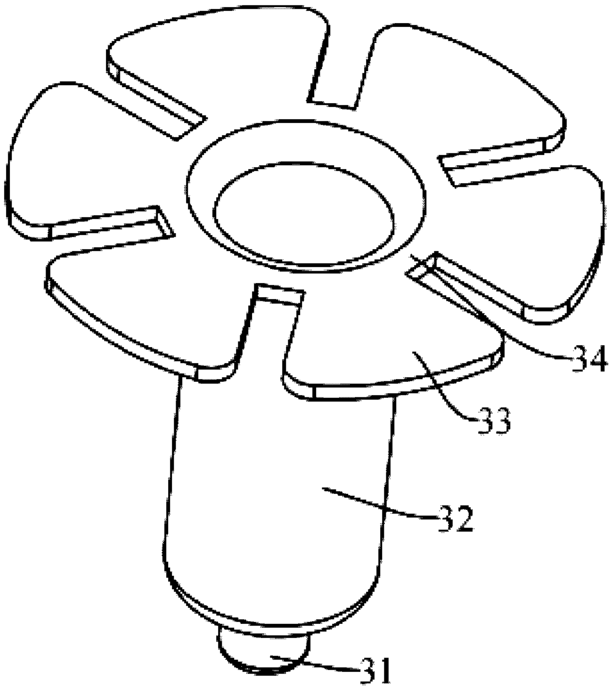
FIG. 4 is a perspective view of a resonator with triangular elastic pieces according to an embodiment of the present disclosure.
Figure 5:
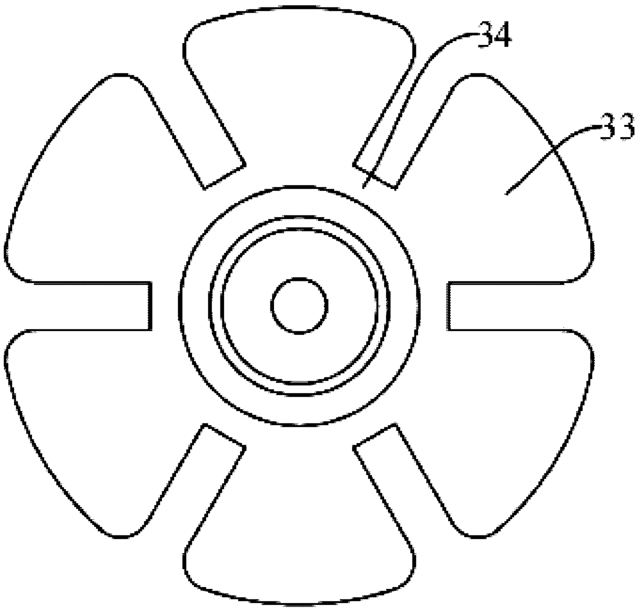
FIG. 5 is a top view of a resonator with triangular elastic pieces according to an embodiment of the present disclosure.
Figure 6:
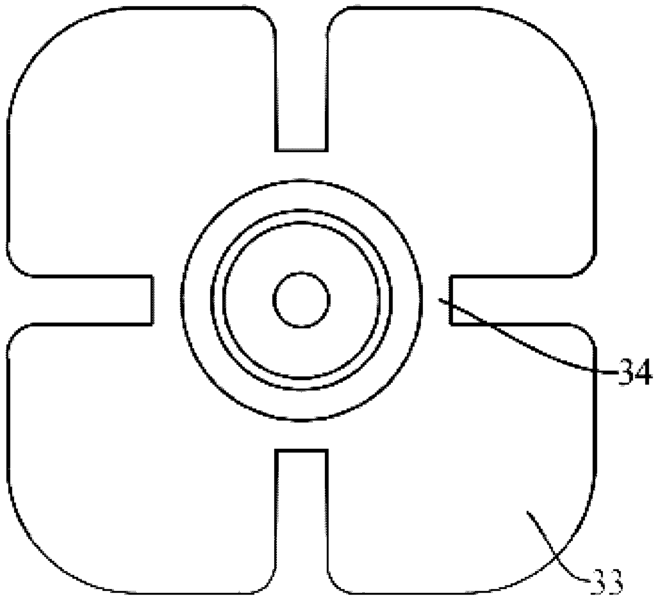
FIG. 6 is a top view of a resonator with quadrilateral elastic pieces according to an embodiment of the present disclosure.

Further, the elastic piece 33 in this embodiment is fan-shaped or polygonal. In detail, when the elastic piece 33 is polygonal, as shown in FIGS. 4 to 6, the elastic piece 33 may be triangular or quadrangular. Those skilled in the art may set a shape of the elastic piece 33 and the number of elastic pieces 33 of each resonator 3 according to requirements, which is not limited herein.

As shown in FIGS. 1 and 2, a respective operation hole 21 corresponding to each elastic piece 33 is disposed on the cover plate 2. It is to be understood that each elastic piece 33 is provided with one respective operation hole 21, which can facilitate the adjustment of any elastic piece 33.

In particular, to facilitate the machining of the resonator 3, the connection portion 31, the body portion 32 and the multiple elastic pieces 33 are integrally formed. In this embodiment, the resonator 3 may be formed by stretching.

Optionally, a disk ring 34 extends at an end of the body portion 32 facing away from the connection portion 31, and the body portion 32 is connected to the multiple elastic pieces 33 through the disk ring 34. The disk ring 34 is disposed so that the connection strength of the elastic pieces 33 can be improved.

Figure 7:
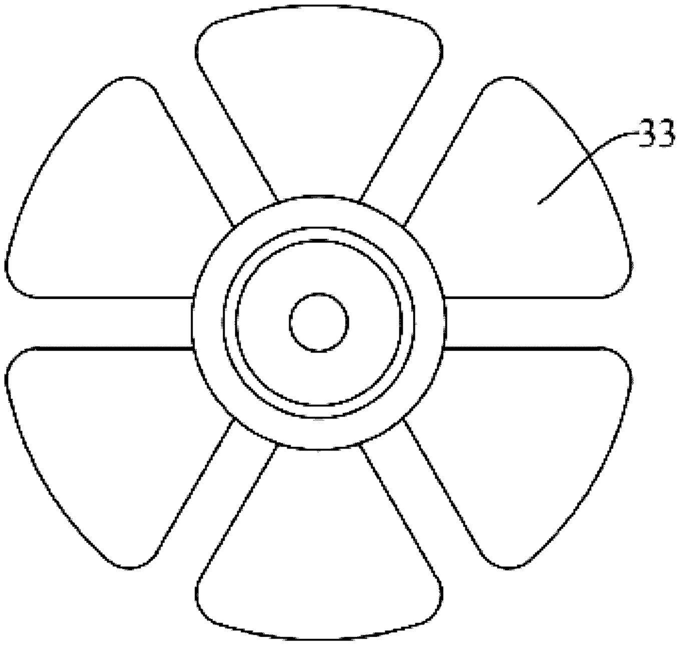
FIG. 7 is a top view of a resonator provided with no disk ring according to an embodiment of the present disclosure.

Of course, in other embodiments, as shown in FIG. 7, the multiple elastic pieces 33 may be directly connected to the body portion 32, which is not limited herein.

Optionally, an extension direction of the multiple elastic pieces 33 is the same as a direction of a plate surface of the cover plate 2, which can save a space and facilitates the adjustment of the elastic piece 33 via the operation holes 21.

As shown in FIG. 3, a mounting protrusion 4 is disposed on a bottom wall of the resonant cavity 11, where the connection portion 31 is connected to the mounting protrusion 4. In detail, in the case where the height of the resonant cavity 11 is constant, the height of the resonator 3 in an up and down direction may be reduced, which is conducive to reducing the cost. In detail, a mounting hole is disposed at a top of the mounting protrusion 4, and the connection portion 31 of the resonator 3 is mounted in the mounting hole. Optionally, the connection portion 31 may be in a threaded connection to or engaged with the mounting hole. A specific manner in which the connection portion 31 is connected to the mounting hole is not limited herein.

As shown in FIG. 1, multiple resonant cavities 11 are provided and sequentially communicate with each other, where one resonator 3 is disposed in each of the multiple resonant cavities 11, a coupling adjustment member 5 is disposed between two communicating resonant cavities 11, and a top end of each coupling adjustment member 5 is connected to the cover plate 2. The strength of electromagnetic coupling between two adjacent resonant cavities 11 is adjusted by the coupling adjustment member 5. Optionally, seven resonant cavities 11 are provided and have the same size, and an opening 12 between each two adjacent resonant cavities 11 is the same in size.

In the related art, the strength of electromagnetic coupling between two adjacent resonant cavities 11 is generally adjusted by a screw threadedly connected to the cover plate 2. To solve the preceding problem, the coupling adjustment member 5 in this embodiment is a countersunk screw fixed to the cover plate 2. Specifically, the depth of the countersunk screw is measured in advance according to a coupling amount compensation requirement and then the countersunk screw is fixed to the cover plate 2 without a subsequent adjustment, so that debugging time can be effectively reduced.

In this embodiment, the housing 1 may be formed through die casting so that the resonant cavities 11 have the uniform size, and the opening 12 between each two adjacent resonant cavities 11 is also kept the same.

The technical principle of the present disclosure is described above in conjunction with the embodiments. The description is merely used for explaining the principle of the present disclosure, and cannot be explained as limitations to the scope of the present disclosure in any manner. Based on the explanations herein, other embodiments of the present disclosure conceived by those skilled in the art without creative work fall within the scope of the present disclosure.

What is claimed is:

1. A coaxial filter, comprising a housing, a cover plate, and a resonator, wherein the housing has a resonant cavity, the cover plate corresponds to the resonant cavity and covers the housing, the resonator comprises a plurality of elastic pieces, a body portion and a connection portion which are sequentially connected from one end to another end of the resonator, the connection portion is connected to a bottom of the resonant cavity, the plurality of elastic pieces are evenly spaced apart along a circumferential direction of the body portion, and a respective operation hole corresponding to each of the plurality of elastic pieces is disposed on the cover plate.

2. The coaxial filter according to claim 1, wherein a plurality of resonant cavities are provided and sequentially communicate with each other, wherein one resonator is disposed in each of the plurality of resonant cavities, a coupling adjustment member is disposed between two communicating ones of the plurality of resonant cavities, and a top end of the coupling adjustment member is connected to the cover plate.

3. The coaxial filter according to claim 2, wherein the coupling adjustment member is a countersunk screw fixed to the cover plate.

4. The coaxial filter according to claim 1, wherein a disk ring extends at an end of the body portion facing away from the connection portion, and the body portion is connected to the plurality of elastic pieces through the disk ring.

5. The coaxial filter according to claim 1, wherein an extension direction of the plurality of elastic pieces is the same as a direction of a plate surface of the cover plate.

6. The coaxial filter according to claim 1, wherein a mounting protrusion is disposed on a bottom wall of the resonant cavity, wherein the connection portion is connected to the mounting protrusion.

7. The coaxial filter according to claim 1, wherein the connection portion, the body portion, and the plurality of elastic pieces are integrally formed.

8. A communication radio frequency device, comprising the coaxial filter according to claim 1.

9. The communication radio frequency device of claim 8, wherein the connection portion, the body portion, and the plurality of elastic pieces are integrally formed.

10. The communication radio frequency device of claim 8, wherein a disk ring extends at an end of the body portion facing away from the connection portion, and the body portion is connected to the plurality of elastic pieces through the disk ring.

11. The coaxial filter according to claim 1, wherein the plurality of elastic pieces are fan-shaped or polygonal.

12. The coaxial filter according to claim 4, wherein the plurality of elastic pieces are fan-shaped or polygonal.

13. The coaxial filter according to claim 5, wherein the plurality of elastic pieces are fan-shaped or polygonal.

14. The coaxial filter according to claim 6, wherein the plurality of elastic pieces are fan-shaped or polygonal.

15. The coaxial filter according to claim 2, wherein the plurality of elastic pieces are fan-shaped or polygonal.

16. The coaxial filter according to claim 3, wherein the plurality of elastic pieces are fan-shaped or polygonal.

17. The coaxial filter according to claim 7, wherein the plurality of elastic pieces are fan-shaped or polygonal.

* * * * *